US006973315B1

(12) United States Patent
Miernik et al.

(10) Patent No.: US 6,973,315 B1
(45) Date of Patent: Dec. 6, 2005

(54) METHOD AND SYSTEM FOR SHARING OVER-ALLOCATED BANDWIDTH BETWEEN DIFFERENT CLASSES OF SERVICE IN A WIRELESS NETWORK

(75) Inventors: Jerzy Miernik, Allen, TX (US); Pulin R. Patel, McKinney, TX (US); Achal R. Patel, McKinney, TX (US); Ojas T. Choksi, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 672 days.

(21) Appl. No.: 09/898,558

(22) Filed: Jul. 2, 2001

(51) Int. Cl.[7] .................................. H04Q 7/20
(52) U.S. Cl. .................. 455/452.2; 455/445; 455/450; 455/451; 455/452.1; 455/453; 455/464; 370/231; 370/235; 370/237; 370/395.41; 370/395.42
(58) Field of Search ................ 455/445, 450, 455/451, 452.1, 452.2, 453, 455, 464; 370/231–235, 370/237, 329, 330, 345, 355–356, 395.21, 370/395.4, 395.41, 395.42, 395.43

(56) References Cited

U.S. PATENT DOCUMENTS

| | | | |
|---|---|---|---|
| 6,216,006 B1 * | 4/2001 | Scholefield et al. ........ 455/450 |
| 6,400,954 B1 * | 6/2002 | Khan et al. ................. 455/450 |
| 6,408,005 B1 * | 6/2002 | Fan et al. ................... 370/412 |
| 6,438,106 B1 * | 8/2002 | Pillar et al. ................ 370/232 |
| 6,501,762 B1 | 12/2002 | Pillar et al. ................ 370/412 |
| 6,560,230 B1 * | 5/2003 | Li et al. ................. 370/395.42 |
| 6,567,415 B1 | 5/2003 | Elwalid et al. ............. 370/412 |
| 6,594,234 B1 | 7/2003 | Chard et al. ............... 370/236 |
| 6,600,752 B1 | 7/2003 | Duong-Van ................ 370/412 |
| 6,618,391 B1 | 9/2003 | Chiussi et al. ............. 370/418 |
| 6,625,122 B1 | 9/2003 | Joffe ......................... 370/230 |
| 6,687,781 B2 | 2/2004 | Wynne et al. .............. 710/317 |
| 6,693,913 B1 | 2/2004 | Chiussi et al. ............. 370/412 |
| 6,744,767 B1 * | 6/2004 | Chiu et al. ............. 370/395.21 |
| 2002/0131363 A1 * | 9/2002 | Beshai et al. ............... 270/230 |

* cited by examiner

*Primary Examiner*—Stephen D'Agosta
(74) *Attorney, Agent, or Firm*—Baker Botts L.L.P.

(57) ABSTRACT

A method and system for sharing over-allocated bandwidth between different classes of service in a wireless network. Traffic is transmitted for a first service class in excess of bandwidth allocated to the first service class using unused bandwidth allocated to a second class. After transmitting traffic for the first service class in excess of bandwidth allocated to the first service class using unused bandwidth allocated to a second class, traffic for a third service class is transmitted in unused bandwidth remaining in the second service class.

17 Claims, 5 Drawing Sheets

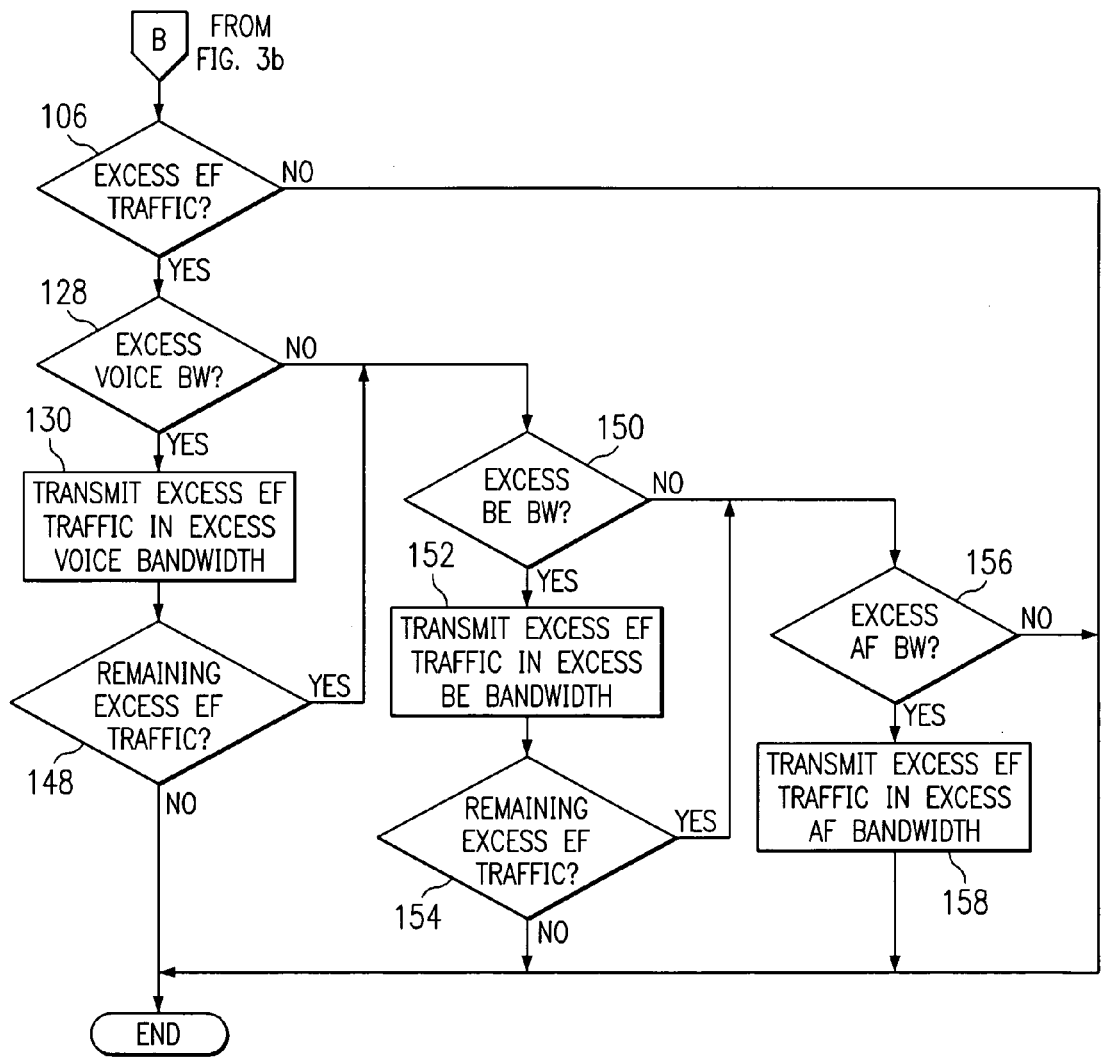

METHOD AND SYSTEM FOR SHARING OVER-ALLOCATED BANDWIDTH BETWEEN DIFFERENT CLASSES OF SERVICE IN A WIRELESS NETWORK

TECHNICAL FIELD OF THE INVENTION

This invention relates in general to the field of wireless communications, and more particularly to a method and system for sharing over-allocated bandwidth between different classes of service in a wireless network.

BACKGROUND OF THE INVENTION

Wireline and wireless Internet protocol (IP) networks have traditionally supported a best effort delivery of all traffic. To support enhanced services, multiple types, or classes, of services have been established and assigned certain class of service (CoS) parameters that help engineer queues for each service type.

The CoS parameters include delay, jitter, error rates, and throughput. The CoS parameters can be provisioned on a per IP connection or per flow basis through mechanisms such as resource reservation protocol (RSVP) or can be provisioned on aggregate flows which are classified into service classes. Internet service providers (ISPs) can utilize the service classes, their associated CoS behavior and CoS provisioning to provide tiered service offerings to their business and consumer customers.

Typically, each service class is allocated a bandwidth to transport corresponding traffic in accordance with the CoS policy. The allocation of bandwidth prevents starvation traffic flows at each CoS level. Traffic in excess of the allocated bandwidths for a service class is held, or dropped causing delay and/or retransmissions.

SUMMARY OF THE INVENTION

The present invention provides a method and system for sharing over-allocated bandwidth between different classes of service in a wireless network that subsequently reduce or eliminate problems and disadvantages with previous systems and methods. In a particular embodiment, the present invention uses excess bandwidth from one or more service classes to satisfy excess demand in other service classes.

In accordance with one embodiment of the present invention, a method for sharing over-allocated bandwidth between service classes in a wireless network includes transmitting traffic for a first service class in excess of bandwidth allocated to the first service class using unused bandwidth allocated to a second class. After transmitting traffic for a first service class in excess of bandwidth allocated to the first service class using unused bandwidth allocated to a second class, traffic for a third service class is transmitted in unused bandwidth remaining in the second service class.

Technical advantages of one or more embodiments of the present invention include more efficient use of the bandwidth available in a wireless sector by sharing over-allocated bandwidth between different classes of service. Other advantages may include fewer packet and/or call drops and thus reduced retransmissions. Additionally, call capacity of the network is increased while preventing class starvation by allocating bandwidth to each class and using over-allocated bandwidth for excess traffic in other classes.

Other technical advantages of the present invention will be readily apparent to one skilled in the art from the following figures, description, and claims.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
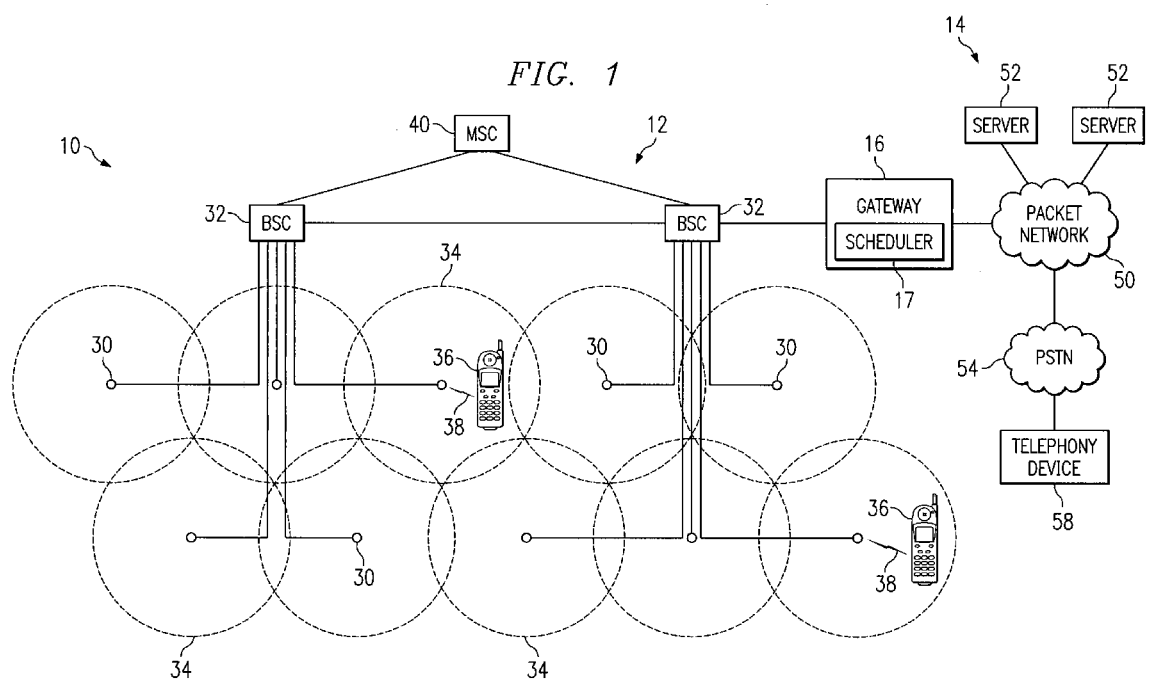
FIG. 1 is a block diagram illustrating a communications network in accordance with one embodiment of the present invention.

Referring to FIG. 1, the communications system 10 includes a wireless network 12 connected to a wireline network 14 through a gateway 16.

The wireless network 12 includes a number of base stations (BTSs) 30 connected to base station controllers (BSCs) 32. The BTSs 30 each cover a geographic region or cell or sector 34 of the wireless network 12 and communicate with mobile devices 36 in the cell 34. The mobile devices 36 may be cell phones, data phones, portable data devices, portable computers, handheld devices, handsets, portable network appliances or other suitable devices capable of communicating information over a wireless link 38.

The BSCs 32 are connected to each other in some way, to the Gateway 16 and to a mobile switching center (MSC) 40. The BSCs 32 and the MSC 40 cooperate to provide switch and handoff functionality for the wireless network 12. In this way, voice, video, data and other information is routed to and from the mobile devices 36 and connections are maintained with the mobile devices 36 as they move throughout, or roam the wireless network 12.

Wireless link 38 is a radio frequency (RF) link. The wireless link 38 may be based on established technologies or standards such as IS-54 (TDMA), IS-95 (CDMA), GSM and AMPS, 802.11 based WLAN, or more recent technology such as CDMA 2000 and W-CDMA or proprietary radio interfaces. In a particular embodiment, wireless link 38 comprises a code division multiple access (CDMA) link based on a CDMA standard and in which packets are segmented into radio frames for transmission over the wireless interface and reassembled by the receiving device to reconstitute the packets.

The wireline network 14 includes a packet or other suitable data network 50 connecting a number of servers 52 to each other and to the gateway. The packet network 50 also connects the gateway, and thus the wireless network 12 to the public switched telephone network (PSTN). Accordingly, mobile devices 36 may communicate through wireless network 12, packet network 50 and PSTN 54 with standard telephones, clients and computers using modems or digital subscriber line (DSL) connections or other telephony devices 58.

The data network 50 may be the Internet, intranet, extranet, or other suitable local or wide area network capable of communicating information between remote endpoints. For the Internet embodiment, information is transmitted in Internet protocol (IP) packets. It will be understood that information may be transmitted in other suitable packets, including asynchronous transport mode (ATM) and other cells or datagrams.

The servers 52 may comprise voicemail servers (VMS), fax/modem servers, short message center (SMSC) servers, conferencing facilities, authentication, authorization, and accounting (AAA) servers, billing servers, home location registers (HLR), home subscriber servers (HSS), domain name servers (DNS) and other suitable servers and functionality providing services to mobile devices 36 and/or to wireless and/or wireline connections in the communications system 10.

The servers 52 and/or other elements of the wireless or wireline network 12 store subscriber level information for users of the wireless and/or wireline network 12. The service level information includes service, quality and/or service level agreement (SLA) parameters for user connections as well as rate and other subscription information. In a particular embodiment, the BSCs 32 and/or Gateway 16 store or access SLA databases including a class of service (CoS) policy and rate information for each user. The CoS may be any suitable service level information that identifies parameters, such as drops, delays, jitters and other limits or levels for the user connections. It will be understood that subscription level information may be otherwise stored and/or accessed for call set up and mobility processing by the communications network 10.

Gateway 16 comprises a scheduler 17. In a particular embodiment, the scheduler 17 comprises logic encoded in media for implementing traffic allocation and other suitable functionality of the system.

Figure 2:
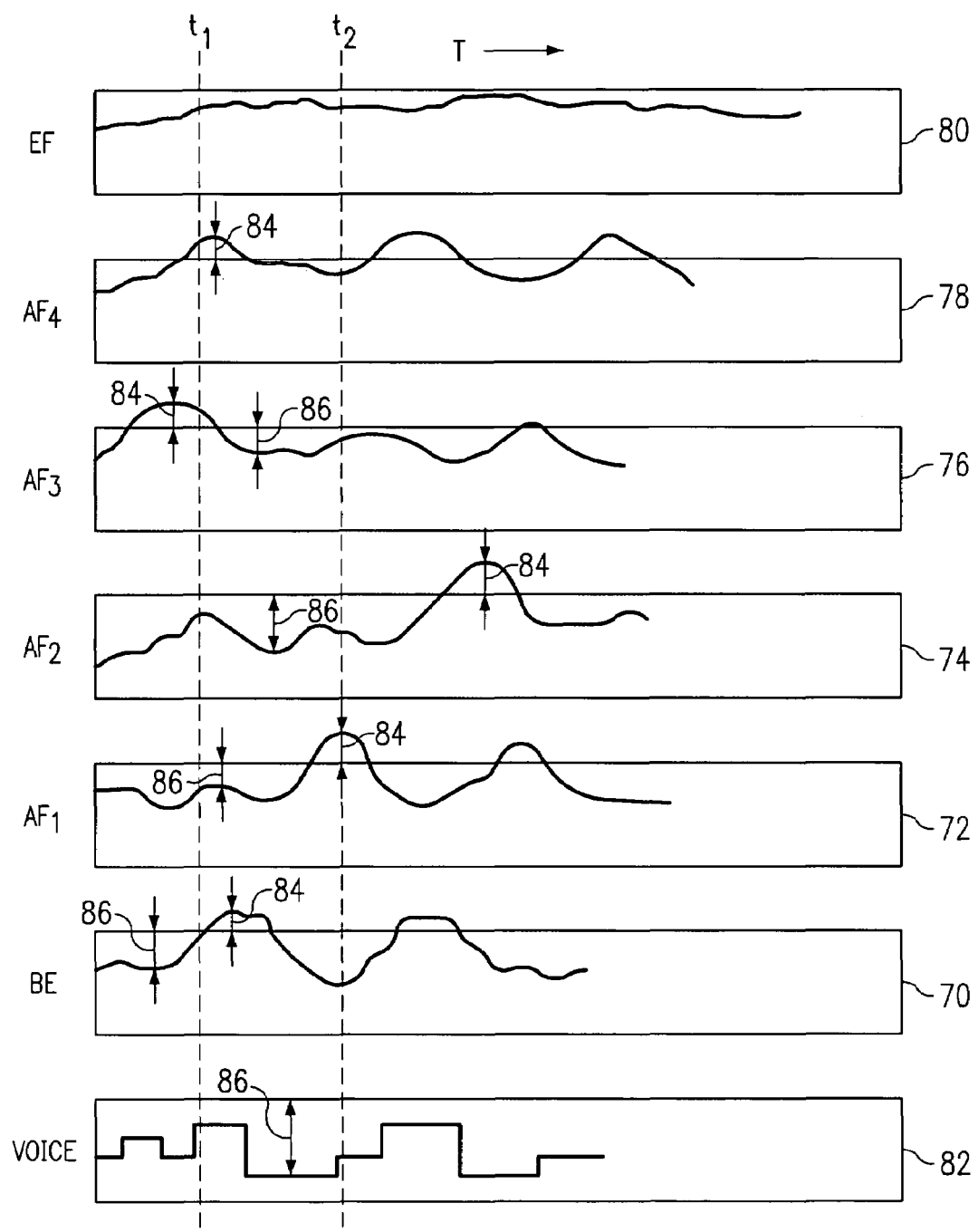
FIG. 2 is a diagram illustrating allocation of bandwidths in a wireless sector of FIG. 1 in accordance with one embodiment of the present invention.

FIG. 2 illustrates, in accordance with an embodiment of the present invention, discrete bandwidths allocated to different classes of service in a wireless sector 34. The allocation of bandwidth prevents starvation by any service class, allows prioritization of transmission resources, and provides differentiated services.

Referring to FIG. 2, the horizontal axes of the graphs represent the passage of time. Bandwidth is represented by the vertical axes. In a particular embodiment, a bandwidth may be allocated to a best effort (BE) class of service 70, assured forwarding (AF) classes of service 72–78, and an expedited forwarding (EF) class of service 80. It will be understood that the allocated bandwidths may comprise fewer, more, and/or different service classes. For example, the allocated bandwidths may comprise a class having a substantial guarantee of traffic arrival, a class with a limited such guarantee, and a class with no or substantially no such guarantee.

In a particular embodiment, the allocated bandwidth are constant or substantially constant. In other embodiments, the allocated bandwidths may vary and may be dynamically determined based on real-time operating character of 12. In either embodiment, the allocated bandwidth may be based on the priority and/or rate of the corresponding traffic and the current, estimated and/or anticipated traffic volume in the service class. Another portion of the total available bandwidth may be allocated to non-bursty traffic flows that are each substantially constant in bandwidth usage 82. The non-bursty traffic may include, for example, voice, video, and other real-time traffic connections.

At any given time, the amount of traffic for certain classes of service may consume more or less than the total amount of allocated bandwidth. Thus, bandwidths may be over-allocated for one or more service classes while under allocated for one or more remaining service classes. This excess traffic 84 or excess bandwidth 86, respectively, may vary with time. For example, at time t1, excess bandwidth is found in the EF, $AF_2$, $AF_1$, and voice allocated bandwidths while $AF_4$, and $AF_3$ allocated bandwidths have excess traffic. At time t2, in contrast, EF, $AF_4$, $AF_3$, $AF_2$, and BE allocated bandwidths have excess bandwidth, while there is excess traffic in $AF_1$ allocated bandwidth.

Figure 3A:
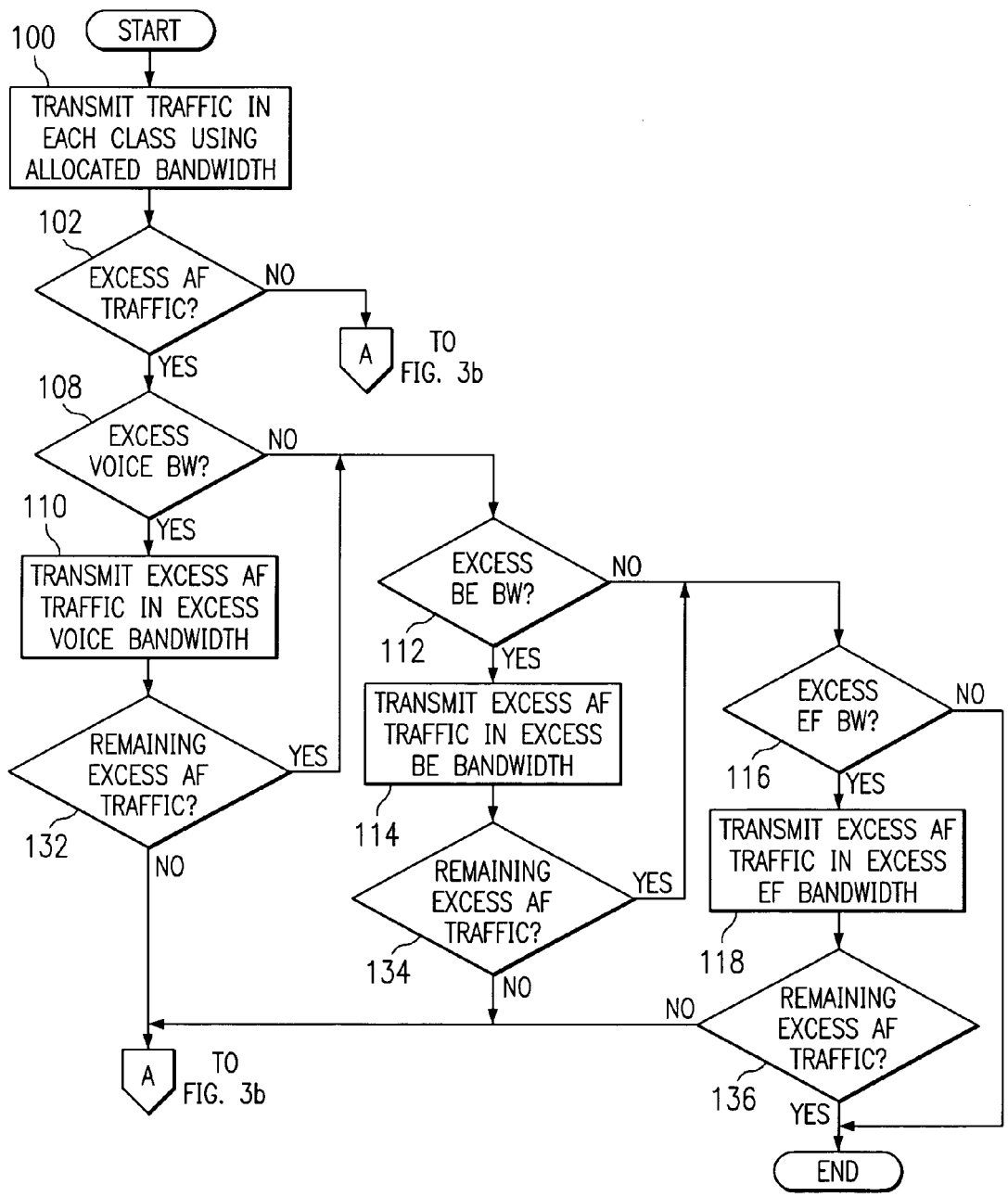
FIG. 3 is a flow diagram a method for sharing over-allocated bandwidth between different classes of service in a wireless sector in accordance with one embodiment of the present invention.
Figure 3B:
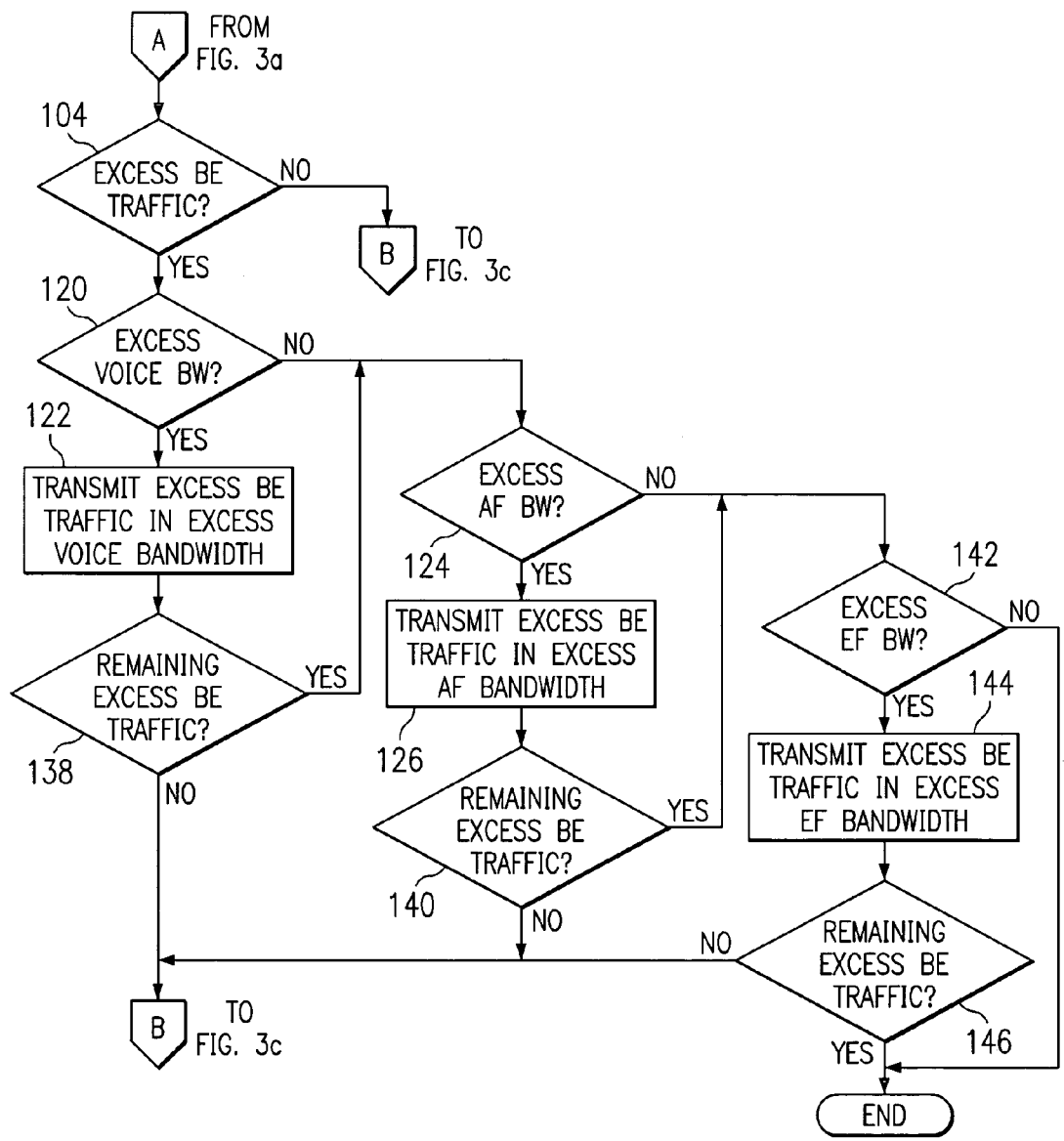

FIG. 3 shows a method for sharing over-allocated bandwidths between different classes of service in a wireless network in accordance with one embodiment of the present invention. In this embodiment, voice traffic is considered as well as three classes of service for bursty traffic: EF, AF, and BE. If there is excess traffic, that traffic is transmitted using excess bandwidth in the following order: AF, BE, and then EF. Excess voice bandwidth is used first, and then excess bandwidth for the other classes in order of increasing priority: BE, AF, and EF. In this particular embodiment, excess bandwidth is first used from non-bursty service classes and then from bursty classes based on priority. This provides maximum remaining bandwidth for the bursty classes. In this embodiment, excess traffic for lower priority classes is placed in excess bandwidth of higher priority, bursty classes. In other embodiments, excess lower-priority traffic may not be transmitted in over-allocated higher-priority class bandwidths.

Referring now to FIG. 3, and in accordance with an embodiment of the present invention, the method begins with step 100 wherein the scheduler 17 in the gateway 16 transmits packet traffic in each class using allocated bandwidth. At determination step 102, the scheduler 17 determines whether there is excess of assured forwarding (AF) traffic. If there is excess AF traffic, the Yes branch leads to determination step 108. At determination step 108, the scheduler 17 determines whether there is an excess amount of voice bandwidth. If there is an excess of voice bandwidth, then, at step 110, excess AF traffic is transmitted using the excess voice bandwidth. At determination step 132, if there is no remaining excess AF traffic, then the scheduler 17 moves on to determination step 104 to determine whether there is excess traffic in the next highest priority service class in which in the illustrated embodiment is BE.

Returning to determination step 132, if there is remaining excess AF traffic after the excess voice bandwidth is fully used, then the Yes branch of determination step 132 leads to determination step 112. The No branch of determination step 108 also leads to determination step 112. At step 112, if there is excess BE bandwidth, the excess AF traffic is transmitted in the excess BE bandwidth at step 114. At determination step 134, if there is no remaining excess AF traffic, then the scheduler moves on to determination step 104 to determine whether there is excess BE traffic.

Returning to determination step 134, if there is remaining excess AF traffic after the excess BE bandwidth is fully used, then the Yes branch leads to determination step 116. The No branch of step 112 also leads to determination step 116. At step 116, if there is not excess EF allocated bandwidth, then all excess bandwidth from one, more or all usable service classes has been fully used and the scheduler 17 has reached the end of the process. If at step 116 there is excess EF bandwidth, the excess AF traffic is transmitted in the excess EF bandwidth at step 118. At determination step 136, if there is remaining excess AF traffic after the excess EF bandwidth is fully used, then all available excess bandwidth has been used and the scheduler has reached the end point of the process. If there is no remaining excess AF traffic, then the scheduler 17 moves on to determination step 104 to determine whether there is excess BE traffic.

At determination step 104, the scheduler 17 determines whether there is excess best effort (BE) traffic. If there is excess BE traffic, the Yes branch leads to determination step 120. At determination step 120, the scheduler 17 determines whether there is an excess amount of voice bandwidth. If there is an excess of voice bandwidth, then, at step 122, excess BE traffic is transmitted using the excess voice bandwidth. At determination step 138, if there is no remaining excess BE traffic, then the scheduler 17 moves on to determination step 106 to determine whether there is excess traffic in the next priority service class in which in the illustrated embodiment is EF.

Returning to determination step 138, if there is remaining excess BE traffic after the excess voice bandwidth is fully used, then the Yes branch of determination step 138 leads to determination step 124. The No branch of determination step 120 also leads to determination step 124. At step 124, if there is excess AF bandwidth, the excess BE traffic is transmitted in the excess AF bandwidth at step 126. At determination step 140, if there is no remaining excess BE traffic, then the scheduler moves on to determination step 106 to determine whether there is excess EF traffic.

Returning to determination step 140, if there is remaining excess BE traffic after the excess AF bandwidth is fully used, then the Yes branch leads to determination step 142. The No branch of step 124 also leads to determination step 142. At step 142, if there is not excess EF allocated bandwidth, then all excess bandwidth from one, more or all usable service classes has been fully used and the scheduler 17 has reached the end of the process. If at step 142 there is excess EF bandwidth, the excess BE traffic is transmitted in the excess EF bandwidth at step 144. At determination step 146, if there is remaining excess BE traffic after the excess EF bandwidth is fully used, then all available excess bandwidth has been used and the scheduler has reached the end point of the process. If there is no remaining excess BE traffic, then the scheduler 17 moves on to determination step 106 to determine whether there is excess EF traffic.

At determination step 106, the scheduler 17 determines whether there is excess expedited forwarding (EF) traffic. If there is excess EF traffic, the Yes branch leads to determination step 128. At determination step 128, the scheduler 17 determines whether there is an excess amount of voice bandwidth. If there is an excess of voice bandwidth, then, at step 130, excess EF traffic is transmitted using the excess voice bandwidth. At determination step 148, if there is no remaining excess EF traffic, then the scheduler 17 has reached the end of the process.

Returning to determination step 148, if there is remaining excess EF traffic after the excess voice bandwidth is fully used, then the Yes branch of determination step 148 leads to determination step 150. The No branch of determination step 128 also leads to determination step 150. At step 150, if there is excess BE bandwidth, the excess EF traffic is transmitted in the excess BE bandwidth at step 152. At determination step 154, if there is no remaining excess EF traffic, then the scheduler has reached the end of the process.

Returning to determination step 154, if there is remaining excess EF traffic after the excess BE bandwidth is fully used, then the Yes branch leads to determination step 156. The No branch of step 150 also leads to determination step 156. At step 156, if there is not excess AF allocated bandwidth, then all excess bandwidth from one, more or all usable service classes has been fully used and the scheduler 17 has reached the end of the process. If at step 156 there is excess AF bandwidth, the excess EF traffic is transmitted in the excess AF bandwidth at step 158. At this point all available excess bandwidth has been used and the scheduler has reached the end point of the process.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for sharing over-allocated bandwidth between service classes in a wireless network comprising:
   transmitting traffic for a first service class in excess of bandwidth allocated to the first service class using unused bandwidth allocated to a third service class; and
   transmitting the traffic for the first service class in unused bandwidth remaining in a second service class in cases where a bandwidth requirement for the traffic is not met by using the unused bandwidth allocated to the third service class, wherein the second class comprises non-bursty traffic flows, and wherein the non-bursty traffic flows comprises voice traffic, wherein the third service class comprises a lower priority than the first service class and the second service class comprises a lower priority than the first service class, and wherein unused voice bandwidth is used to accommodate the bandwidth requirement before using the unused bandwidth allocated to the third service.

2. The method of claim 1, wherein the third service class comprises a best effort (BE) class of service, the second service class comprises an assured forwarding (AF) class of service, and the first service class comprises an expedited forwarding (EF) class of service.

3. The method of claim 1, further comprising:
   coordinating bandwidth for each of the service classes such that the traffic is transmitted according to rules associated with the priorities of each of the service classes.

4. The method of claim 1, wherein the first service class comprises video traffic.

5. A system for sharing over-allocated bandwidth between service classes in a wireless network comprising:
   means for transmitting traffic for a first service class in excess of bandwidth allocated to the first service class using unused bandwidth allocated to a third service class; and
   means for transmitting the traffic for the first service class in unused bandwidth remaining in a second service class in cases where a bandwidth requirement for the traffic is not met by using the unused bandwidth allocated to the third service class, wherein the second class comprises non-bursty class of service (CoS), and wherein the non-bursty CoS comprises voice traffic, wherein the third service class comprises a lower priority than the first service class and the second service class comprises a lower priority than the first service class, and wherein unused voice bandwidth is used to accommodate the bandwidth requirement before using the unused bandwidth allocated to the third service.

6. The system of claim 5, wherein the third service class comprises a best effort (BE) class of service, the second service class comprises an assured forwarding (AF) class of service, and the first service class comprises an expedited forwarding (EF) class of service.

7. The system of claim 5, further comprising:
means for coordinating bandwidth for each of the service classes such that the traffic is transmitted according to rules associated with the priorities of each of the service classes.

8. The system of claim 5 wherein the first service class comprises video traffic.

9. A system for sharing over-allocated bandwidth between service classes in a wireless network comprising logic encoded in media, the logic operable to:
transmit traffic for a first service class in excess of bandwidth allocated to the first service class using unused bandwidth allocated to a third service class; and
transmit the traffic for the first service class in unused bandwidth remaining in a second service class in cases where a bandwidth requirement for the traffic is not met by using the unused bandwidth allocated to the third service class, wherein the second class comprises non-bursty class of service (CoS), and wherein the non-bursty CoS comprises voice traffic, wherein the third service class comprises a lower priority than the first service class and the second service class comprises a lower priority than the first service class, and wherein unused voice bandwidth is used to accommodate the bandwidth requirement before using the unused bandwidth allocated to the third service.

10. The system of claim 9, wherein the third service class comprises a best effort (BE) class of service, the second service class comprises an assured forwarding (AF) class of service, and the first service class comprises an expedited forwarding (EF) class of service.

11. The system of claim 10, wherein the logic is further operable to:
coordinate bandwidth for each of the service classes such that the traffic is transmitted according to rules associated with the priorities of each of the service classes.

12. The system of claim 10, wherein the first service class comprises video traffic.

13. A method for sharing over-allocated bandwidth between service classes in a wireless network comprising:
transmitting traffic for a first service class in excess of bandwidth allocated to the first service class using unused bandwidth allocated to a second class; and
after transmitting traffic for a first service class in excess of bandwidth allocated to the first service class using unused bandwidth allocated to a second class, transmitting traffic for the first service class in unused bandwidth remaining in a third service class, wherein the second class comprises non-bursty traffic flows, and wherein the non-bursty traffic flows comprises voice traffic, wherein the third service class comprises a lower priority than the first service class and the second service class comprises a lower priority than the first service class, and wherein unused voice bandwidth is used to accommodate the bandwidth requirement before using the unused bandwidth allocated to the third service.

14. The method of claim 13, wherein the third service class comprises a best effort (BE) class of service, the second service class comprises an assured forwarding (AF) class of service, and the first service class comprises an expedited forwarding (EF) class of service.

15. The method of claim 13, further comprising:
coordinating bandwidth for each of the service classes such that the traffic is transmitted according to rules associated with the priorities of each of the service classes.

16. The method of claim 13, wherein the first service class comprises video traffic.

17. A method for sharing over-allocated bandwidth between service classes in a wireless network comprising:
transmitting expedited assured forwarding (AF) traffic in bandwidth allocated to AF traffic;
transmitting best effort (BE) traffic in bandwidth allocated to BE traffic;
transmitting voice traffic in bandwidth allocated to voice traffic;
transmitting AF traffic in excess of bandwidth allocated to AF traffic using unused bandwidth allocated to voice traffic if, after transmitting voice traffic in bandwidth allocated to voice traffic, bandwidth allocated to voice traffic is available;
transmitting AF traffic in excess bandwidth allocated to BE traffic if, after transmitting BE traffic in bandwidth allocated to BE traffic, bandwidth allocated to BE traffic is available and bandwidth allocated to voice traffic is unavailable; and
transmitting BE traffic in excess of bandwidth allocated to BE traffic using unused bandwidth allocated to voice traffic if, after transmitting voice traffic in bandwidth allocated to voice traffic and after transmitting AF traffic in excess of bandwidth allocated to AF traffic in bandwidth allocated to voice traffic, bandwidth allocated to voice traffic is available, wherein the BE traffic comprises non-bursty traffic flows, and wherein the non-bursty traffic flows comprises voice traffic.

* * * * *